United States Patent
Tscheternigg et al.

(10) Patent No.: US 6,859,011 B2
(45) Date of Patent: Feb. 22, 2005

(54) METHOD FOR CONTROLLING THE CHARGING AND DISCHARGING PHASES OF A BACKUP CAPACITOR AND A CIRCUIT CONFIGURATION FOR CARRYING OUT THE METHOD

(75) Inventors: Siegfried Tscheternigg, Vilgertshofen (DE); Armin Wedel, Mering (DE)

(73) Assignee: Infineon Technologies AG, Munich (DE)

( * ) Notice: Subject to any disclaimer, the term of this patent is extended or adjusted under 35 U.S.C. 154(b) by 226 days.

(21) Appl. No.: 10/431,482

(22) Filed: May 6, 2003

(65) Prior Publication Data

US 2003/0210018 A1 Nov. 13, 2003

Related U.S. Application Data

(63) Continuation of application No. PCT/DE01/04170, filed on Nov. 6, 2001.

(30) Foreign Application Priority Data

Nov. 6, 2000 (DE) .......................................... 100 54 970

(51) Int. Cl.[7] .................................................. H02J 7/00
(52) U.S. Cl. ....................................................... 320/130
(58) Field of Search ................................. 320/130, 166, 320/167; 307/43, 64, 70; 323/271, 273, 275, 281, 282, 284, 285, 288, 315, 316, 317

(56) References Cited

U.S. PATENT DOCUMENTS

| | | | | |
|---|---|---|---|---|
| 4,827,111 A | * | 5/1989 | Kondo | ........................ 235/380 |
| 5,828,208 A | * | 10/1998 | Oku | ............................ 323/282 |
| 6,172,494 B1 | | 1/2001 | Feuser | ......................... 323/288 |
| 6,507,130 B1 | | 1/2003 | Thüringer et al. | ............. 307/70 |

FOREIGN PATENT DOCUMENTS

| | | |
|---|---|---|
| DE | 198 36 045 A1 | 3/2000 |
| DE | 198 50 293 A1 | 5/2000 |
| DE | 199 07 575 A1 | 8/2000 |
| DE | 199 11 673 A1 | 9/2000 |
| EP | 1 022 683 A2 | 7/2000 |
| EP | 1 098 267 A1 | 5/2001 |
| EP | 1 113 386 A2 | 7/2001 |
| FR | 2 774 492 A1 | 8/1999 |
| FR | 2 776 410 A1 | 9/1999 |
| WO | 00/13300 | 3/2000 |

\* cited by examiner

*Primary Examiner*—Edward H. Tso
*Assistant Examiner*—Pia Tibbits
(74) *Attorney, Agent, or Firm*—Laurence A. Greenberg; Werner H. Stemer; Gregory L. Mayback

(57) ABSTRACT

A method for controlling the charging and discharging phases of a backup capacitor for a data storage medium has the step where the backup capacitor is first discharged to a defined voltage level before it is charged. The capacitor is discharged using a constant current. This ensures that the charging current for the backup capacitor cannot be used to identify what the charge-state of the capacitor was before discharging. Therefore, it is no longer possible to infer the currents that flowed during security-related arithmetic operations in a data processing unit. In one advantageous circuit configuration, a constant current source is formed by a current-mirror circuit, and a comparator is used to compare the voltage on the backup capacitor with a bandgap reference.

5 Claims, 2 Drawing Sheets

METHOD FOR CONTROLLING THE CHARGING AND DISCHARGING PHASES OF A BACKUP CAPACITOR AND A CIRCUIT CONFIGURATION FOR CARRYING OUT THE METHOD

CROSS-REFERENCE TO RELATED APPLICATION

This application is a continuation of copending International Application No. PCT/DE01/04170, filed Nov. 6, 2001, which designated the United States and was not published in English.

BACKGROUND OF THE INVENTION

Field of the Invention

The invention relates to a method for controlling the charging and discharging phases of a backup capacitor for a data storage medium having a data processing unit. The backup capacitor is connected to a voltage supply input on the data processing unit. The method includes:

a) the data processing unit and the backup capacitor are isolated from a supply potential;

b) arithmetic operations are carried out in the data processing unit; and c) the backup capacitor is connected to the supply potential, and this charges the backup capacitor.

The background to the method is the fact that data processing units processing secret key data need to be configured such that, during a calculation, the power consumption cannot be used to infer the key data. In particular, it is necessary to prevent the analysis methods known as "Simple Power Analysis" (SPA) and "Differential Power Analysis" (DPA) from being able to be applied. By buffering the voltage supply for an arithmetic and logic unit during a calculation cycle, a current profile of the arithmetic and logic unit during the performance of critical arithmetic operations is concealed. However, the discharge level of the backup capacitor can be used to read off how much activity there was in the data processing unit during a buffer period. There is the risk that a subsequent recharging current, which is dependent on the previous discharge level of the backup capacitor, can be used to infer the processed secret data or possibly to infer proprietary algorithmic processing.

SUMMARY OF THE INVENTION

It is accordingly an object of the invention to provide a method for controlling the charging and discharging phases of a backup capacitor and a circuit configuration for carrying out the method which overcome the above-mentioned disadvantages of the prior art devices and methods of this general type, in which buffering is provided for a data processing unit using a backup capacitor such that, during recharging of the backup capacitor, it is not possible to infer the power consumption during a calculation cycle. The intention is also to specify a circuit configuration for carrying out the method.

With the foregoing and other objects in view there is provided, in accordance with the invention, a method for controlling charging and discharging phases of a backup capacitor for a data storage medium having a data processing unit. The backup capacitor is connected to a voltage supply input on the data processing unit. The method includes the steps of isolating the data processing unit and the backup capacitor from a supply potential, carrying out arithmetic operations in the data processing unit, discharging the backup capacitor to a prescribed voltage using a constant current, and subsequently, connecting the backup capacitor to the supply potential for charging the backup capacitor.

The object is achieved by a method of the type mentioned in the introduction that is characterized in that, before the backup capacitor is charged, the backup capacitor is discharged to a prescribed voltage using a constant current.

For the circuit configuration, the object is achieved by a circuit configuration having a backup capacitor that can be discharged via a switchable constant current source. The backup capacitor being able to be connected to a supply potential, and a comparator is provided whose first input can be connected to the backup capacitor and whose second input has a reference voltage applied to it. A control unit is provided which is connected to the output of the comparator. The control unit being able to actuate a first switch for the purpose of connecting the backup capacitor to the supply potential and also a second switch for the purpose of switching the constant current source.

As a result of the backup capacitor being discharged to a prescribed voltage, the charge taken up when the capacitor is charged is always the same. It is thus no longer possible to infer the charge-state of the backup capacitor after a calculation cycle.

One particular advantage is that the backup capacitor is discharged to the prescribed voltage using a constant current, because it has to be assumed that a circuit configuration detecting that the prescribed voltage has been reached has a dead time. In this time, the backup capacitor is discharged further. If it is not discharged using a constant current, the backup capacitor voltage following the end of the discharging phase is again dependent on the discharge level following the end of performance of the arithmetic operations, albeit to a much lesser degree than in the case of a method or a circuit configuration based on the prior art. In one advantageous refinement of the circuit configuration, discharging using a constant current can be realized by a current-mirror circuit.

It is also advantageous if the backup capacitor is discharged via a series circuit containing a resistor and a transistor, because this forms a voltage divider which can be set such that the voltage tapped off between the transistor and the resistor can be compared with the specific voltage of a bandgap reference.

In accordance with an added feature of the invention, a processing unit having an output is provided. The control unit has a flip-flop with an output and an AND gate with a first input, a second input and a third input. The output of the flip-flop is connected to the first input of the AND gate, the output of the processing unit is connected to the second input of the AND gate, and the output of the comparator is connected to the third input of the AND gate.

In accordance with an additional feature of the invention, the switchable constant current source has a series circuit formed of a resistor and a transistor connected to the backup capacitor for discharging the backup capacitor. The series circuit forms a voltage divider and provides a voltage tapped off between the transistor and the resistor. The voltage tapped off is compared with the reference voltage being a bandgap reference by the comparator.

Other features which are considered as characteristic for the invention are set forth in the appended claims.

Although the invention is illustrated and described herein as embodied in a method for controlling the charging and discharging phases of a backup capacitor and a circuit configuration for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
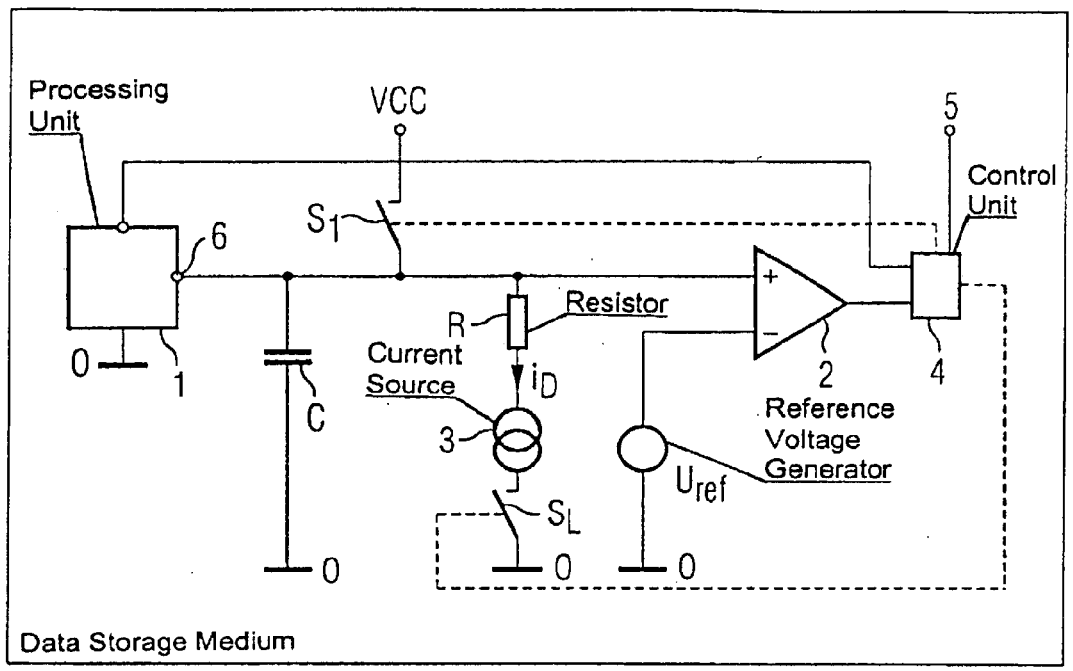
FIG. 1 is first schematic illustration of a circuit configuration according to the invention.

Referring now to the figures of the drawing in detail and first, particularly, to FIG. 1 thereof, there is shown a basic configuration of a circuit configuration which can be used to carry out the inventive method. A data processing unit 1 for a data storage medium is not connected to a supply voltage VCC directly, but rather a supply voltage input 6 can be isolated from the supply voltage VCC by a first switch S1. In addition, a backup capacitor C is connected to the supply voltage input 6. When the first switch S1 is open, the data processing unit 1 is therefore supplied with voltage by the backup capacitor C. An operating time for which the data processing unit 1 can be supplied by the backup capacitor C is dependent on a capacitance of the capacitor C and on the power consumption of the data processing unit 1. The purpose of the configuration is to decouple the data processing unit 1 from the supply voltage VCC when critical, i.e. security-related, arithmetic operations are being carried out in the data processing unit 1, so as to prevent the power consumption for the entire circuit with the data processing unit 1 from being able to be used to infer the secret key. However, if the switch S1 is closed again when the performance of arithmetic operations has ended, the capacitor C is charged, and it is still possible to use the charging current to identify how much charge has been drawn from the capacitor C during the performance of secret arithmetic operations.

To prevent this, the capacitor C is discharged to a particular voltage value and only after that is it charged to a rated voltage again. One conceivable way of doing this would be to discharge the capacitor C to a constant voltage generated by a suitable circuit. However, this would mean that the constant voltage source is changed over to a capacitive load. Owing to the fact that the constant voltage source is not ideal and is supplied by the supply voltage in practice, this solution also reveals a supply current that is dependent on the voltage level of the capacitor C. Hence, such a circuit is not suitable for completely concealing the power consumption during secret arithmetic operations.

By contrast, the invention involves the capacitor C being discharged via a constant current source 3 until the voltage across the capacitor C reaches a defined lower limit value. The discharging path is then interrupted by a switch S2, and the switch S1 is closed in order to recharge the capacitor C in this way. The lower limit value of the voltage is detected using a comparator 2 that compares the voltage across the capacitor C with a reference voltage $U_{ref}$. Connected to the output of the comparator 2 is a control unit 4 that controls the switches S1 and S2. The control unit 4 itself is actuated by the data processing unit 1 before the start and after the end of performance of a secret arithmetic operation. This indicates when the switch S1 needs to be opened, which results in that the data processing unit 1 is thus supplied with voltage via the backup capacitor C, and when a discharging operation, i.e. closure of the switch S2, needs to be performed. The end of the discharging operation is detected autonomously by the comparator 2, and hence the time for opening the switch S2 and for closing the switch S1 is stipulated. In addition, the control unit 4 can be actuated via an additional input 5, for example by an additional circuit that stipulates the initial conditions.

When a capacitor is discharged via a resistor R, the voltage across the capacitor falls in accordance with an exponential function without any additional measures. If, as in the circuit configuration shown in FIG. 1, the comparator 2 now establishes that the lower prescribed voltage for the capacitor has been reached, then it takes some time before the switch S2 is open. During this time, the capacitor C is discharged further. The dead time for the comparator 2 and for the switch S2 is admittedly always the same, but since the voltage across the capacitor C falls in an exponential function, the actual final voltage of the capacitor C is still dependent on its previous charge level.

In one form of the invention, discharging is therefore effected using a constant current, which is ensured by the constant current source 3, meaning that although the voltage across the capacitor C still falls further during the dead time of the comparator 2 and of the switch S2, the final value of the voltage is independent of the previous charge state.

Figure 2:
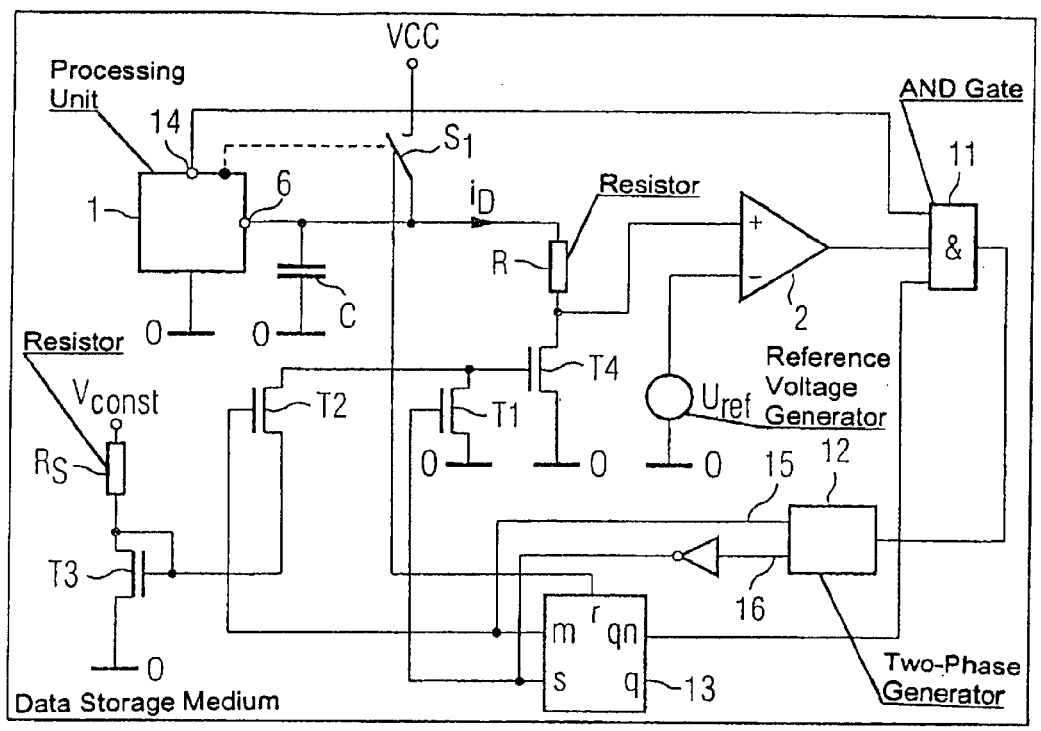
FIG. 2 is a second, more specific refinement of the circuit configuration.

FIG. 2 now shows a more specific refinement of the inventive circuit configuration having a current-mirror circuit for producing a constant current source and a configuration containing an AND gate 11, a two-phase generator 12 and a flip-flop 13 for producing a control unit. As in the exemplary embodiment in FIG. 1, the voltage supply input 6 on the data processing unit 1 is connected to the supply voltage VCC. The backup capacitor C is also provided and is used to ensure that the data processing unit 1 is supplied with voltage when the switch S1 is open. In contrast to FIG. 1, the non-inverting input of the comparator 2 is not connected to the capacitor C or to the voltage supply input 6 directly, but instead the voltage is tapped off between a resistor R and a series-connected transistor T4. The capacitor C is thus discharged via the resistor R and the transistor T4, these forming a voltage divider during discharging. The voltage tap between the resistor R and the transistor T4 is chosen because the comparator 2 is intended to compare the voltage with the reference voltage $U_{ref}$, and the reference voltage $U_{ref}$ is intended to be produced by a bandgap reference. The bandgap reference voltage is typically 1.203 V, while the voltage to which the capacitor C needs to be discharged is beneficially 2.0 V. The voltage divider containing the resistor R and the transistor T4 therefore needs to be provided such that there is a voltage drop of approximately 0.8 V across the resistor. If the voltage were tapped off directly on the capacitor C, comparison with a bandgap reference would not be possible.

The constant current source is produced by a current-mirror circuit containing a resistor $R_S$ and the transistor T3 in the reference path and containing the transistor T4. In the reference path, the resistor $R_S$ is connected in series with the transistor T3 and is between a constant voltage $V_{const}$ and the reference-ground potential 0. The size of the resistor $R_S$ and the constant voltage $V_{const}$ thus stipulate what current flows in the reference path. This also determines what current can flow through the transistor T4. The transistor T1 connected between the control connection on the transistor T4 and the reference-ground potential switches the transistor T4. The transistor T2 connected between the control connection on the transistor T3 and the control connection on the transistor T4 allows current-mirroring to be turned on and off.

If the capacitor C is not yet at its lower voltage level, the result of comparison by the comparator 2 is a HIGH signal. If the switch S1 is open, the flip-flop 13 is reset and the negated output qn of the flip-flop 13 is HIGH. If the data processing unit 1 now additionally signals that the security-related arithmetic operations have ended and the capacitor can be discharged, an output 14 of the data processing unit 1 is at HIGH and this signal is applied to the AND gate 11 as a third input signal. As a result, the voltage level at the output of the AND gate 11 changes to HIGH and the discharging operation is therefore initiated. The two-phase generator 12 is used to generate two time-delayed signals 16 and 15 from the output signal from the AND gate 11. First, the signal 16 is used to open the transistor T1, which results in the transistor T4 being turned on. The second signal 15 is used to turn on the transistor T2, so that the current-mirror circuit becomes active and the current through the resistor $R_S$ is mirrored into the discharging path. Since a discharging current $I_D$ is constant, there is a constant voltage drop across the resistor R, the voltage being set to 0.8 V in this exemplary embodiment. With an original voltage of 2.4 V across the capacitor C and a voltage drop of 0.8 V across the resistor R, a voltage of 1.6 V is now applied to the non-inverting input of the comparator 2, while the reference voltage $U_{ref}$ is 1.2 V. Only when the capacitor is discharged to a voltage of 2 V is the voltage at the non-inverting input of the comparator 2 less than the voltage at the inverting input. At this instant, the output signal from the comparator 2 falls, and the LOW signal at the input of the AND gate 11 means that the AND gate output also changes to LOW. As a result, the transistor T1 is turned on, which results in that the discharging transistor T4 turns off and discharging of the capacitor C has ended. Following closure of the switch S1, the capacitor C can now be recharged.

Naturally, various refinements of a circuit configuration are possible for such operation, but while the backup capacitor C is discharged by a constant current $I_D$ these circuits are covered by the invention.

We claim:

1. A method for controlling charging and discharging phases of a backup capacitor for a data storage medium having a data processing unit, the backup capacitor connected to a voltage supply input on the data processing unit, which comprises the steps of:

isolating the data processing unit and the backup capacitor from a supply potential;

carrying out arithmetic operations in the data processing unit;

discharging the backup capacitor to a prescribed voltage using a constant current; and subsequently, connecting the backup capacitor to the supply potential for charging the backup capacitor.

2. A circuit configuration, comprising:

a switchable constant current source for providing a constant current;

a backup capacitor coupled to said switchable constant current source for being discharged via said constant current of said switchable constant current source, said backup capacitor being able to be connected to a supply potential;

a comparator having a first input connected to said backup capacitor, a second input receiving a reference voltage, and an output;

a first switch connected to said backup capacitor and having a terminal for receiving the supply potential;

a second switch connected to said switchable constant current source; and a control unit connected to said output of said comparator, said control unit connected to and able to actuate said first switch for connecting said backup capacitor to the supply potential, said control unit connected to said second switch for switching through said switchable constant current source.

3. The circuit configuration according to claim 2, wherein said switchable constant current source is a current-mirror circuit.

4. The circuit configuration according to claim 2, further comprising a processing unit having an output; and wherein said control unit has a flip-flop with an output and an AND gate with a first input, a second input and a third input, said output of said flip-flop connected to said first input of said AND gate, said output of said processing unit connected to said second input of said AND gate, and said output of said comparator being connected to said third input of said AND gate.

5. The circuit configuration according to claim 2, wherein said switchable constant current source has a series circuit formed of a resistor and a transistor connected to said backup capacitor for discharging said backup capacitor, said series circuit forming a voltage divider and providing a voltage tapped off between said transistor and said resistor, the voltage tapped off is compared with the reference voltage being a bandgap reference by said comparator.

* * * * *